(12) United States Patent
Staver

(10) Patent No.: US 10,241,292 B2
(45) Date of Patent: Mar. 26, 2019

(54) ULTRA-FAST AND MECHANICALLY STABLE ZOOM LENS

(71) Applicant: BAE SYSTEMS Information and Electronic Systems Integration Inc., Nashua, NH (US)

(72) Inventor: Philip R Staver, Wilton, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 442 days.

(21) Appl. No.: 15/374,475

(22) Filed: Dec. 9, 2016

(65) Prior Publication Data

US 2018/0231738 A1 Aug. 16, 2018

(51) Int. Cl.
| | |
|---|---|
| *G02B 15/02* | (2006.01) |
| *G02B 27/30* | (2006.01) |
| *G02B 15/14* | (2006.01) |
| *G02B 7/10* | (2006.01) |
| *H04N 5/232* | (2006.01) |
| *G03B 13/34* | (2006.01) |
| *G02B 27/64* | (2006.01) |
| *G02B 15/16* | (2006.01) |

(52) U.S. Cl.
CPC .............. *G02B 7/102* (2013.01); *G02B 15/02* (2013.01); *G02B 15/16* (2013.01); *G02B 27/646* (2013.01); *G03B 13/34* (2013.01); *H04N 5/23248* (2013.01); *H04N 5/23296* (2013.01)

(58) Field of Classification Search
CPC .... G02B 27/00; G02B 27/0938; G02B 27/30; G02B 13/009; G02B 15/02; G02B 15/04
USPC ................................ 359/641, 672, 674, 676
See application file for complete search history.

(56) References Cited

U.S. PATENT DOCUMENTS

| | | | |
|---|---|---|---|
| 3,825,315 | A | 7/1974 | Altman et al. |
| 3,947,084 | A | 3/1976 | Noyes |
| 4,588,266 | A | 5/1986 | Komoto |
| 4,885,600 | A | 12/1989 | Iwasa et al. |
| 5,587,843 | A | 12/1996 | Chen |
| 6,002,706 | A | 12/1999 | Staver et al. |
| 6,191,802 | B1 | 2/2001 | Kessler |
| 6,829,102 | B2 | 12/2004 | Ohashi et al. |
| 2006/0193059 | A1* | 8/2006 | Gutierrez ............... G02B 15/02 359/672 |
| 2014/0177065 | A1 | 6/2014 | Adachi |

FOREIGN PATENT DOCUMENTS

JP 2006003781 A 1/2006

* cited by examiner

*Primary Examiner* — William Choi

(74) *Attorney, Agent, or Firm* — Maine Cernota & Rardin

(57) ABSTRACT

A zoom lens having unpowered optical elements changeably inserted between conventional powered optical zoom elements enables ultra-fast and mechanically stable stepped changes in zoom state.

20 Claims, 7 Drawing Sheets

ULTRA-FAST AND MECHANICALLY STABLE ZOOM LENS

STATEMENT OF GOVERNMENT INTEREST

The invention was made with United States Government support under Contract No. 14-C-8215 awarded by a Classified Agency. The United States Government has certain rights in this invention.

FIELD

The disclosure relates to lenses, and more particularly, to an ultra-fast and mechanically stable zoom lens.

BACKGROUND

Frequently, in aerospace applications, it is desired to illuminate a distant target with a highly collimated beam, such as a laser beam. During the time that the target is illuminated, it may be desirable to change the divergence of the laser beam (and hence the size of the beam on the target). One reason for this may be that the target is changing its position, and hence its distance, to the platform that contains the laser. Therefore, if the divergence is changed, the overall power illuminating the target may be preserved, or changed. For example, if the target is receding from the laser source, it may be desirable to reduce the divergence of the transmitted laser beam in order to maintain, or even increase the power incident on the target.

Furthermore, there are some circumstances where it is desired to change the size of the transmitted beam very quickly. In cases where rapid changes in size are required of a beam transmitted over very large distances, there is a heightened need to make these optical changes while keeping any change in the pointing of the transmitted illumination source as minimal as possible, since even relatively minor changes in beam direction at the source can result in significant deflections of the beam by the time it reaches the target.

In order for conventional optical systems to change the divergence of a transmitted beam, a conventional lens called a "zoom lens," such as an afocal zoom lens. Afocal zoom lenses are used in this example because they are particularly suitable for use in changing the divergence of collimated light sources, such as that used in a laser.

In a conventional zoom lens assembly, there are lenses and lens groups that move on mechanical stages, or platforms, along the longitudinal axis of the lens. The mechanical precision, stability, and speed of these motion devices must be exorbitant in order to change the zoom magnification quickly and maintain the pointing direction precisely. This is mainly because the powered optical elements of such an assembly are moving with respect to each other and, to preserve the pointing direction, the positions of their relative centers must be preserved along the original optical axis to the same degree of precision of the mechanical assembly tolerances of the lenses.

In the context of this disclosure, powered optical elements should be understood to refer to curved optical elements that change the direction of light passing therethrough. In short, such elements are considered to have "optical power." As an example, a lens which is of a plano-convex shape has positive optical power (i.e. it focuses light incident thereon), while a lens with a plano-concave shape has a negative optical power (it causes a divergence of light incident thereon).

Conversely, unpowered optical elements, as used in this disclosure, should be understood to refer to relatively flat optical elements that do not change the direction of light passing therethrough. In short, unpowered optical elements have no optical power, i.e. no optical bending power. The "unpowered" term only refers to the ability of the optical element to bend light that passes through it. A slab of glass with plano sides is an example of an unpowered optic.

Importantly, the terms "powered" and "unpowered," as they are used in the present disclosure, are not meant to convey any information regarding whether or not the optical elements are rotated, translated, or otherwise moved by a motor or by a user.

There are many examples of zoom lenses described in public resources, such as journal publications and patents. For example, the following 3 US patents describe zoom lenses and zoom mechanisms: U.S. Pat. No. 3,825,315 (1974), Zoom Lens Optical System for Infrared Wavelengths; U.S. Pat. No. 5,587,843 (1996), Zoom Lens Mechanism; and U.S. Pat. No. 4,885,600 (1989), Zoom mechanism for a zoom lens in cameras and the like. These patents describe apparatuses that are typical of all zoom lenses in that they employ various mechanical devices to move the powered optical elements with respect to each other along a common axis. Due to this basic similarity in their design, they all suffer from the difficulties and limitations described above.

The present disclosure solves these problems by describing a device and a method that allow for the rapid change of zoom states, without impacting the mechanical pointing precision of the powered optical elements.

SUMMARY

One embodiment of the present disclosure provides an ultra-fast and mechanically stable zoom lens comprising: a first powered optical element disposed in an optical path and configured to converge a beam incident the optical path; a first unpowered, changeable optical element disposed in the optical path after the first powered optical element and configured to effectively alter the path length of the beam; a second powered optical element disposed in the optical path after the first unpowered optical element and configured to diverge a beam incident the optical path; a second unpowered, changeable optical element disposed in the optical path after the second powered optical element and configured to effectively alter the path length; and an objective lens disposed in the optical path after the second unpowered, changeable optical element and configured to collimate light incident thereon, wherein the first and second unpowered, changeable optical element are configured to provide a stepped change in zoom state by changing at least one of the first unpowered, changeable optical element and the second unpowered, changeable optical element for optical elements of different magnification.

Another embodiment of the present disclosure provides such an ultra-fast and mechanically stable zoom lens further comprising an optical element holding apparatus configured to hold a plurality of unpowered optical elements and to selectively place one of the plurality of unpowered optical elements in the optical path.

A further embodiment of the present disclosure provides such an ultra-fast and mechanically stable zoom lens wherein the optical element holding apparatus is substantially circular and comprises optical element holding apertures disposed substantially evenly about the optical element holding apparatus, wherein the optical elements are seated in the apertures.

Yet another embodiment of the present disclosure provides such an ultra-fast and mechanically stable zoom lens further comprising two optical element holding apparatuses, wherein each is configured to hold a plurality of unpowered optical elements and to selectively place one of the plurality of optical elements in the optical path.

A yet further embodiment of the present disclosure provides such an ultra-fast and mechanically stable zoom lens wherein the optical element holding apparatuses are operated by at least one of the following means: manually, semi-automatically and automatically.

Still another embodiment of the present disclosure provides such an ultra-fast and mechanically stable zoom lens wherein the first powered optical element, the second powered optical element, and the objective lens are fixed in their respective positions along the optical path.

A still further embodiment of the present disclosure provides such an ultra-fast and mechanically stable zoom lens wherein the first powered optical element and the objective lens are configured for longitudinal translation along the optical path.

Even another embodiment of the present disclosure provides such an ultra-fast and mechanically stable zoom lens wherein the first powered optical element, the second powered optical element, and the objective lens are configured for longitudinal translation along the optical path.

One embodiment of the present disclosure provides an ultra-fast and mechanically stable variable focal length lens comprising: a focal lens; a first powered optical element disposed in the optical path of the focal lens and configured to converge a beam incident the optical path; a first unpowered optical element disposed in the optical path adjacent the first powered optical element and configured to alter the path length of the beam; a second powered optical element disposed in the optical path adjacent the first unpowered optical element and configured to diverge a beam incident the optical path; a second unpowered optical element disposed in the optical path adjacent the second powered optical element and configured to alter the path length; and an objective lens disposed in the optical path adjacent the second unpowered optical element and configured to collimate light incident thereon, wherein the unpowered optical elements are changeably suspended in the optical path and a stepped change in focal length may be achieved by swapping the first and second unpowered optical elements for ones of different magnification.

Another embodiment of the present disclosure provides such an ultra-fast and mechanically stable variable focal length lens further comprising two unpowered optical element holding apparatuses, wherein each is configured to hold a plurality of unpowered optical elements and to selectively dispose any of the plurality of unpowered optical elements in the optical path.

A further embodiment of the present disclosure provides such an ultra-fast and mechanically stable variable focal length lens wherein the unpowered optical element holding apparatuses comprise unpowered optical element holding apertures disposed substantially evenly about the optical element holding apparatus, wherein the optical elements are seated in the apertures.

Yet another embodiment of the present disclosure provides such an ultra-fast and mechanically stable variable focal length lens wherein the first powered optical element, the second powered optical element, and the objective lens are fixed in their respective positions along the optical path.

A yet further embodiment of the present disclosure provides such ultra-fast and mechanically stable variable focal length lens wherein the first powered optical element and the objective lens are configured for longitudinal translation along the optical path.

Still another embodiment of the present disclosure provides such an ultra-fast and mechanically stable variable focal length lens wherein the first powered optical element, the second powered optical element, and the objective lens are configured for longitudinal translation along the optical path.

One embodiment of the present disclosure provides an ultra-fast and mechanically stable zoom lens comprising: a first powered optical element disposed in an optical path and configured to converge a beam incident the optical path; a plurality of unpowered optical elements disposed in an unpowered optical element holding apparatus, wherein the unpowered optical element holding apparatus is configured to hold the plurality of unpowered optical elements and to selectively dispose at least one of the plurality of unpowered optical elements in the optical path adjacent the first powered optical element, wherein each the unpowered optical elements is configured to effectively alter the path length of the beam incident thereon by a differing amount; a second powered optical element disposed in the optical path after the first unpowered optical element and configured to diverge the beam incident the optical path; a plurality of unpowered optical elements disposed in a second unpowered optical element holding apparatus, wherein the second unpowered optical element holding apparatus is configured to hold a plurality of unpowered optical elements and to selectively dispose at least one of the plurality of unpowered optical elements in the optical path adjacent the second powered optical element, wherein each the unpowered optical elements is configured to alter the effective path length of the beam by a differing amount; an objective lens disposed in the optical path after the second unpowered optical element and configured to collimate light incident thereon, wherein the selection of different combinations of unpowered optical elements disposed in the optical path accomplishes a stepped change in zoom state and wherein each the unpowered optical element holding apparatus comprises unpowered optical element holding apertures disposed substantially evenly therein, wherein the unpowered optical elements are seated in the apertures.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

A method and apparatus for quickly changing the magnification of an afocal telescope is herein described. Embodiments of the present disclosure also describe methods and apparatuses for quickly changing the effective focal length and field of view of an imaging lens.

Although embodiments of the present disclosure that are configured as afocal telescopes are described herein as being useful for the magnification of a collimated beam, such as a laser beam, they may be used with any light source, including, but not limited to, a laser.

Figure 1:
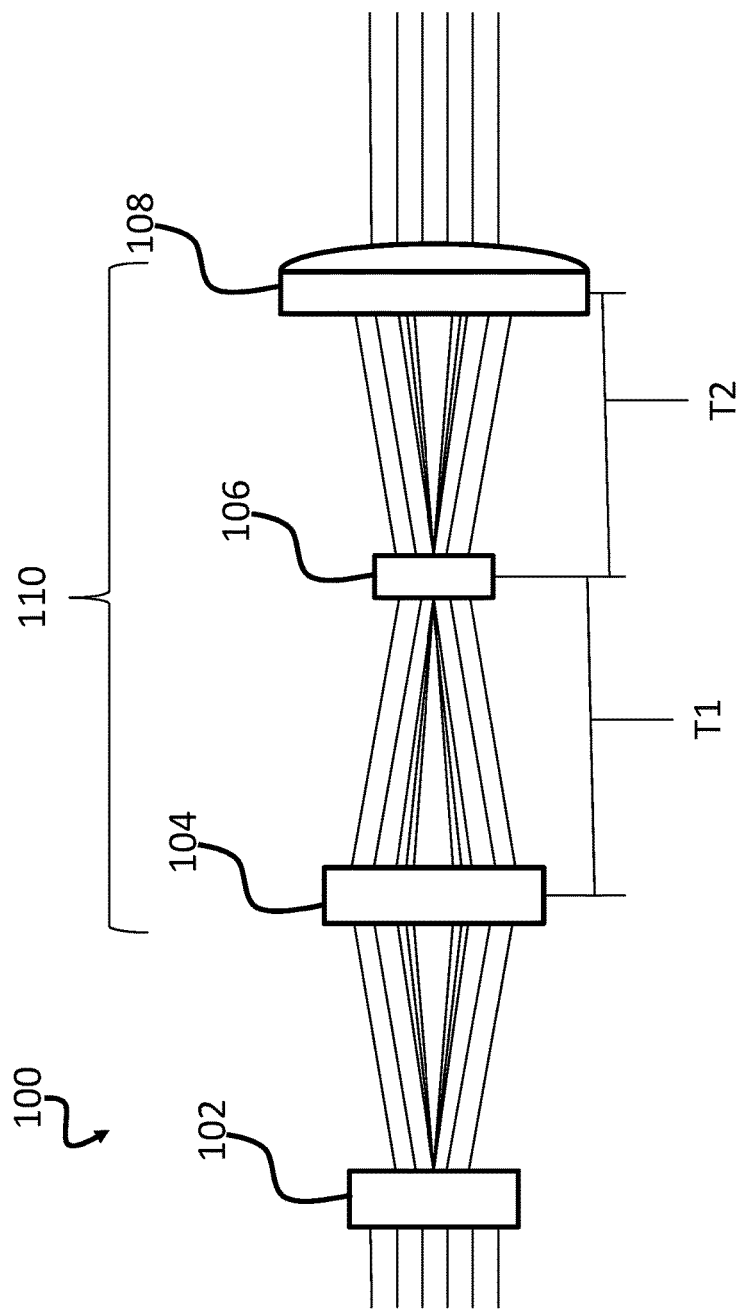
FIG. 1 is a right-side elevation view of an afocal zoom beam expander, as exists in the prior art.

In optics, an afocal system (a system without focus), such as that shown in FIG. 1, which shows an optical zoom beam expander 100, is an optical system that produces no net convergence or divergence of the beam. Such a system has an infinite effective focal length. This type of system can be created with a pair of optical elements where the distance between the elements is equal to the sum of each element's focal length (d=f1+f2). A simple example of an afocal optical system is an optical telescope imaging a star, the light entering the system is at infinity and the image it forms is at infinity (the light is collimated). The divergence of a laser beam, travelling through such a system, is changed by the inverse of the magnification of the system, where, the magnification of such a system is given by $$M = \frac{f2}{f1},$$

where f1 is the focal length of a first element and f2 is the focal length of a second element. More specifically, if the telescope expands the beam diameter by a factor of M, the divergence will be reduced by a factor of 1/M. The inverse of this is also true.

Afocal systems are commonly used in laser optics, for instance as afocal zoom beam expanders 100, as well as in infrared and forward looking infrared systems, camera zoom lenses and telescopic lens attachments such as teleside converters, and photography setups combining cameras and telescopes (afocal photography).

In the field of optics, it is generally accepted that, in order to create an afocal optical system with a variable magnification, a minimum of three lenses are required and the spacing values between the three lenses must be varied independently. This configuration requires a minimum of two mechanical positioning systems that must independently move two of the lenses with respect to a third (typically) fixed lens.

Now referring to FIG. 1, a depiction of a conventional zoom lens, which can also be referred to as an afocal zoom beam expander 100, is shown. Such a lens converts one collimated beam to another by changing the diameter of the beam. The afocal zoom beam expander 100 shown in FIG. 1 comprises a first lens element 102 in optical alignment with a first zoom element 104 that is in further optical alignment with a second zoom element 106 that is itself in optical alignment with a third zoom element 108. By varying the vertex spacing between first zoom element 104 and the second zoom element 106 (T1) in conjunction with the vertex spacing between the second zoom element 106 and the third zoom element 108 (T2), a change in zoom state may be achieved.

Figure 2:
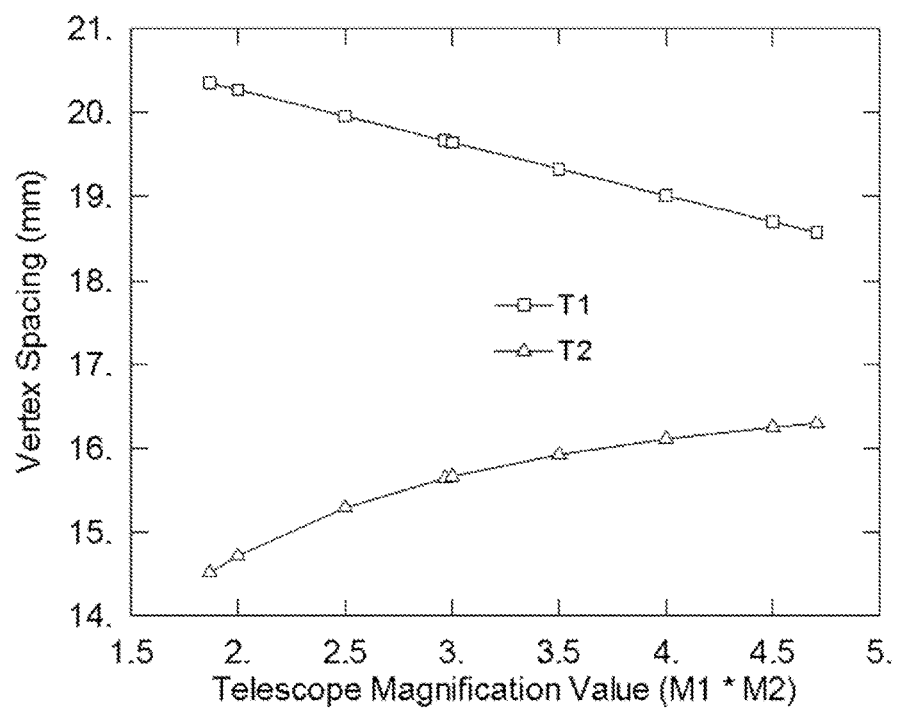
FIG. 2 is a graph showing the spacing values between the convex lens element 104 and movable zoom element 106 (represented by top line, T1) and movable zoom element 106 and objective lens 108 (represented by bottom line, T2) shown in the optical configuration depicted in FIG. 1 compared to the magnification provided by such spacing.

The values for T1 and T2, as a function of telescopic magnification provided by various configurations of those values, are summarized in FIG. 2, where the topmost, downwardly-sloping line represents T1 and the bottommost, upwardly-sloping line represents T2. Both T1 and T2 converge to increase the magnification. For example, for a telescopic magnification value of 2, the vertex spacing of T1 is at about 20.4 mm and T2 is at about 14.7 mm. At a telescopic magnification value of 4, the vertex spacing of T1 is at about 19 mm and T2 is at about 16 mm.

Changing of zoom states in such a conventional zoom lens notably requires longitudinal motion of the powered optical zoom elements 110, lenses 104, 106, and 108. Specifically, the two spacing values, T1 and T2, are required to change. Any change in alignment of such lenses that occurs during this longitudinal motion will affect the image produced by such a lens, therefore it is of utmost importance to machine such powered optical zoom elements 110 and associated components that are responsible for the longitudinal translation thereof as precisely as possible to minimize these effects. However precise such alignment is, however, there will always be some change in the image during a change in zoom state using such a system.

Figure 3:
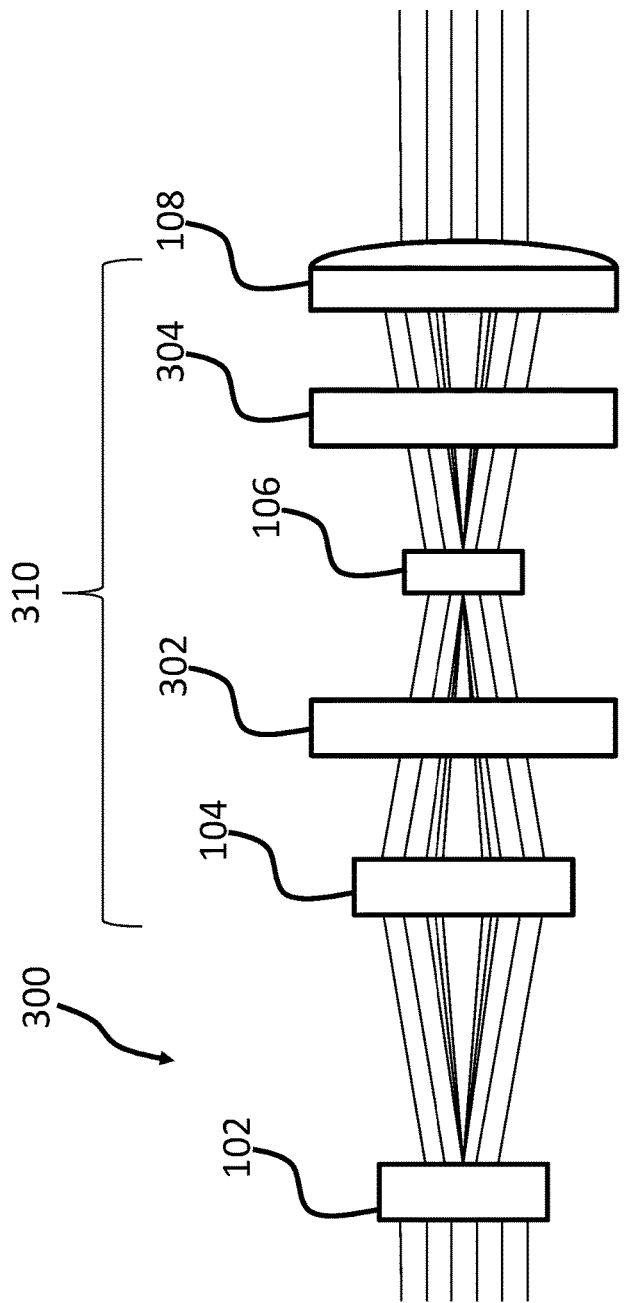
FIG. 3 is a right-side elevation view of an afocal optical stepped zoom lens, which is configured in accordance with embodiments of the present disclosure.

Embodiments of the present disclosure, such as that shown in FIG. 3, achieve a change of zoom states while leaving all powered optical elements in fixed locations. Specifically, the spacing value, which may also be referred to as the path length, between powered optical elements 104, 106, and 108 is effectively altered by inserting unpowered optical elements 302, 304, such as flat glass plates or slabs 302, 304, of various thicknesses into the optical path or beam of a lens. In embodiments, such unpowered optical elements 302, 304 are inserted between traditional powered optical zoom elements 104, 106, and 108, without changing their physical positions. Because the unpowered optical elements 302, 304 responsible for altering the path length do not result in substantial convergence or divergence of the beam transmitted therethrough, their precise placement in the beam does not result in a substantial change in the image transmitted therethrough.

This characteristic allows the zoom state to be effectively, rapidly, and stably changed just after the beam crosses the periphery of the unpowered optical elements 302, 304 that are responsible for altering the path length, since the motion of those unpowered optical elements 302, 304 does not appreciably affect the image, thus allowing the elements to be rapidly advanced in front of the beam and slowly brought to a stop, if desired, without increasing the time to achieve a stable zoom state. Furthermore, as no longitudinal motion of the powered optical elements 104, 106, and 108 is necessary, such elements do not have to be precisely machined and can be made more inexpensively than those of the prior art without sacrificing the quality of the zoom lens.

In embodiments, the speed at which the zoom states can be changed is increased by placing the unpowered optical elements 302, 304 as near as possible to lens element 106.

Now referring to FIG. 3, an afocal optical stepped zoom lens 300 configured in accordance with embodiments of the present disclosure is shown. Unlike the conventional afocal zoom lens of FIG. 1, the lens of FIG. 3 does not require moving powered optical zoom elements 104, 106, and 108 longitudinally along the optical path to change zoom states, although embodiments may still accommodate longitudinal motion of such elements. The lens of FIG. 3 achieves rapid, stepped changes in zoom states by inserting a flat glass plate or plates 302 between lenses 104 and 106 and/or another plate or plates 304 between lenses 106 and 108, resulting in a stepped optical zoom assembly 310. In certain embodiments, a plate or plates may be inserted between only one set of lenses.

The magnification of the afocal telescope of FIG. 3 can be selected by choosing the thickness of unpowered optical elements 302 placed between powered optical elements, such as lenses 104 and 106 and the thickness of unpowered optical elements 304 placed between powered optical elements 106 and 108.

Figures 4A, 4B:
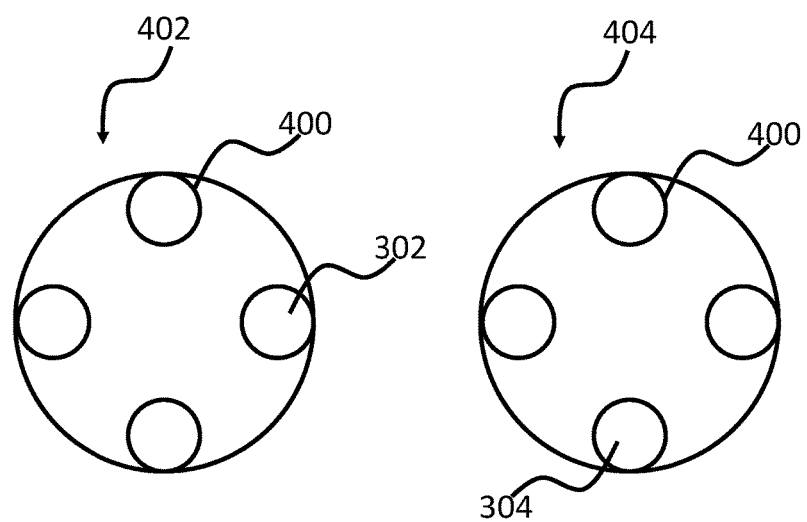
FIGS. 4a and 4b are front elevation views of unpowered optical element carriers, configured in accordance with embodiments of the present disclosure.

FIG. 4a shows a carrier 402 of plates 302, wherein the plates 302 have differing thicknesses. Likewise, FIG. 4b shows a carrier 404 of plates 304, wherein the plates 304 have differing thicknesses. When a change in zoom state is desired, the plates 302, 304, which are shown in FIG. 4a and FIG. 4b, may be exchanged for plates 302, 304 of different thicknesses, resulting in a changed zoom state. Although such a change could be accomplished manually, embodiments provide for such a change to be made mechanically, using pre-loaded plates 302, 304 of different thicknesses mounted in a carrier 402, 404, such as the turret-style carriers 402, 404 depicted in FIG. 4a and FIG. 4b, to achieve rapid changes between zoom states. In one embodiment the plates 302 and 304 have respective similar thicknesses while in a further embodiment the thicknesses vary. The number of plates 302, 304 in a turret 402, 404 varies and can be based on the particular desired goal and application. If a large variation of magnification is required having more granularity, more lenses are used. Space and weight considerations are also a factor that is accommodated in the final design.

Referring again to FIGS. 4a and 4b, two unpowered optical element carriers 402/404 are shown. Each carrier 402/404 is depicted as having four plate-holding apertures 400, wherein each plate-holding aperture 400 is capable of holding one or more unpowered optical elements 302, 304 of various thicknesses. In embodiments, one or more unpowered optical element-holding apertures 400 may be left empty to achieve a desired set of stepped zoom states.

Figure 5:
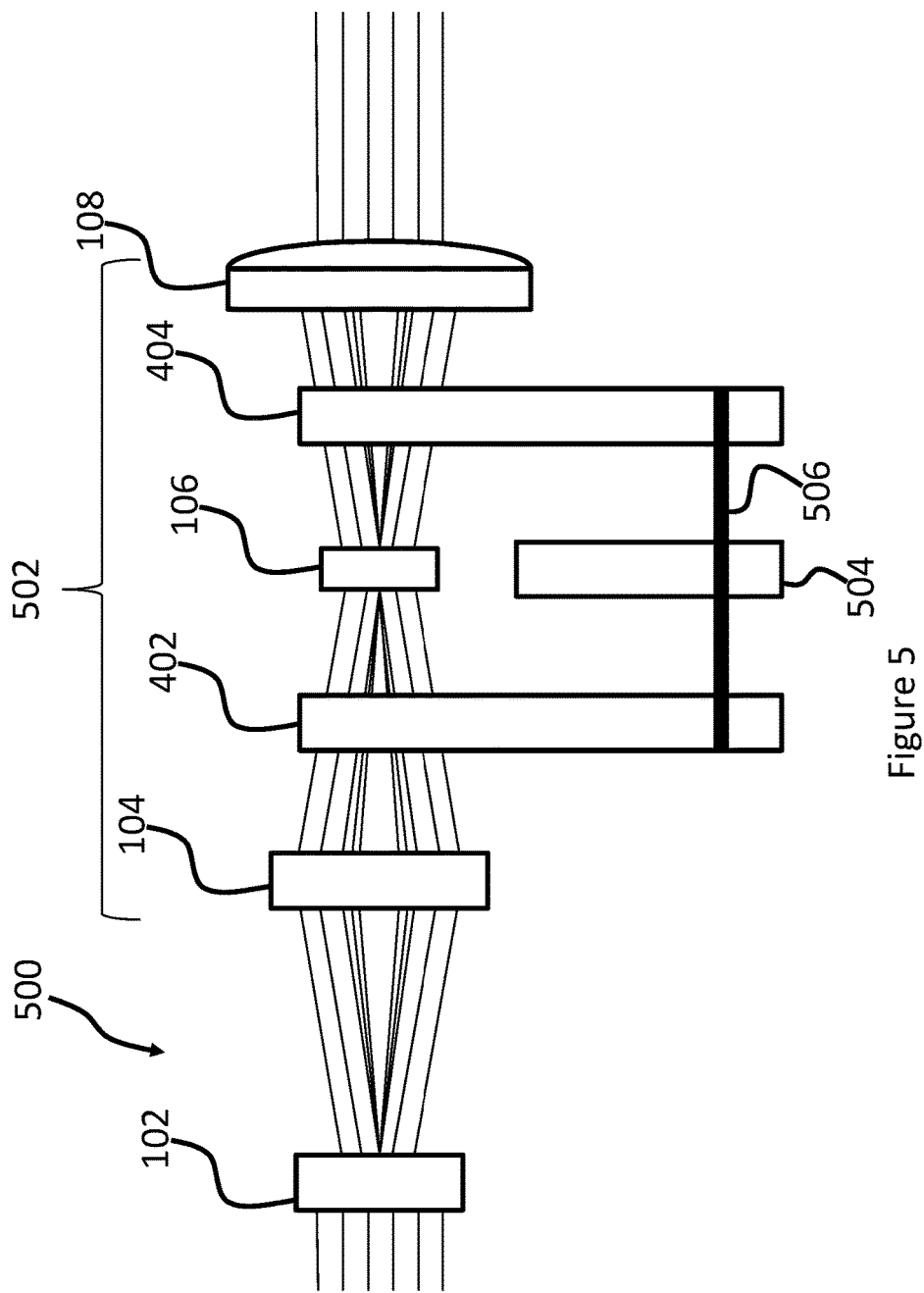
FIG. 5 is a right-side elevation view of an afocal optical stepped zoom lens having motorized unpowered optical element carriers, which is configured in accordance with embodiments of the present disclosure.

Now referring to FIG. 5, an embodiment of a motorized, stepped optical zoom lens 500 is shown. This embodiment, like that shown in FIG. 3, does not require moving powered optical zoom elements 104, 106, and 108 longitudinally along the optical path to change zoom states, although embodiments may still accommodate longitudinal motion of such elements. Also like the zoom assembly 310 of FIG. 3, the zoom lens 500 of FIG. 5 achieves rapid, stepped changes in zoom states by inserting a flat glass plate or plates 302 between lenses 104 and 106 and/or another plate or plates 304 between lenses 106 and 108, to allow for rapid, stepped changes in zoom state. Unlike the zoom assembly 310 shown in FIG. 3, the zoom lens assembly 502 of FIG. 5 incorporates unpowered optical elements 302, 304 into the carriers 402, 404, as shown in FIGS. 4a and 4b. These carriers 402, 404 are, in embodiment and like the unpowered optical elements 302, 304 shown in FIG. 3, positioned between conventional powered optical elements 104, 106 and 106, 108. In embodiments, these carriers 402, 404 may be rotated by a motor 504, which, in embodiments, may be a pneumatic, electronic, electro-pneumatic, spring-driven or other suitable motor, in operative connection with the carriers 402, 404 through a drive means 506, which, in embodiments, may be a gear set, transmission, belt, timing belt, magnetic drive, or other suitable power-conveying means, as would be known to one of ordinary skill in the art.

Figure 6:
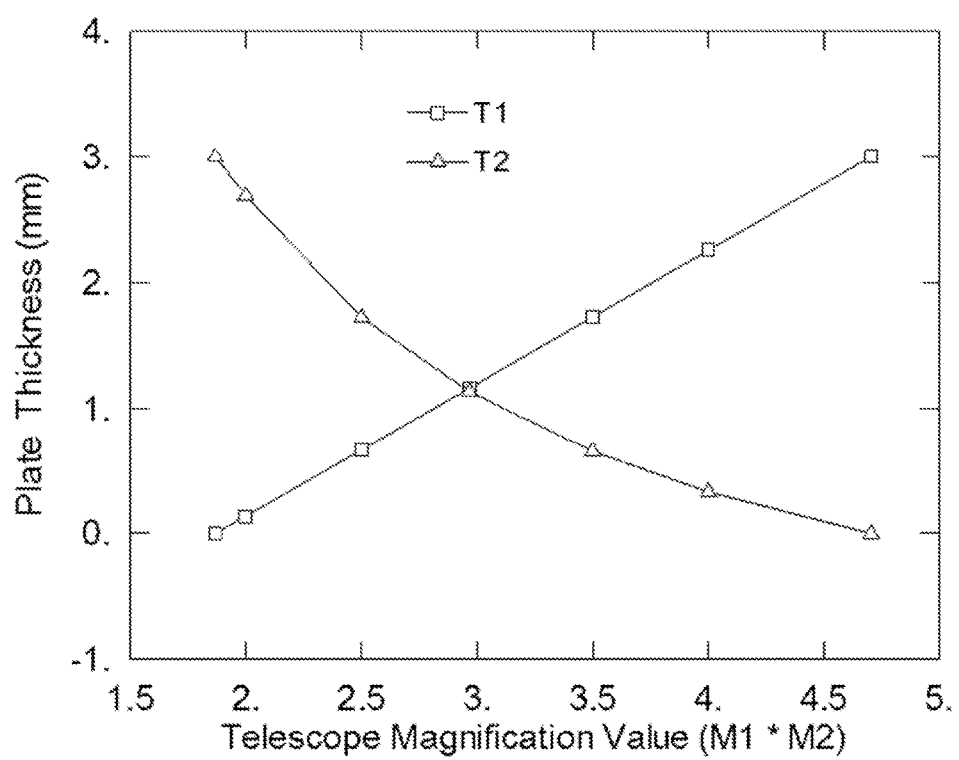
FIG. 6 is a graph showing the plate thickness values and different magnification settings achieved by various combinations thereof in the afocal zoom lens depicted in FIG. 3, wherein lines T1, the upwardly-sloping line, and T2, the downwardly-sloping line, represent the thickness of unpowered optical elements in an optical path relative to their telescopic magnification value.

FIG. 6 is a graph showing the thickness values used for different magnification settings of the afocal stepped zoom lens 300 depicted in FIG. 3 and the afocal, motorized, stepped zoom lens 500 depicted in FIG. 5. In this figure, the Y-axis value of T1, the upwardly-sloping line, corresponds to the thickness of the unpowered optical element 302 inserted between lens elements 104 and 106 and the Y-axis value of T2, the downwardly-sloping line, corresponds to the thickness of the unpowered optical element 304 inserted between lens elements 106 and 108. According to one embodiment, the unpowered optical elements 302, are manually inserted by the user. In another embodiment, the unpowered optical elements 302, 304 are semi-automated and are inserted via an electro-mechanical system wherein the user can manipulate the unpowered optical elements 302, 304, whether contained in a carrier 402, 404 or stored externally from the lens, by a push-button or similar trigger. In a hands free mode embodiment, the unpowered optical elements 302, 304 are coupled to an electro-mechanical system that has processing capability such that voice commands can be used to insert and/or rotate the carriers 402, 404. In a more fully automated mode, the system would leverage other instrumentation, for example laser ranging, so that the distance to the target is known and the appropriate unpowered optical elements 302, 304 are inserted, by rotation of carriers 402, 404 or by other means, as would be apparent to one of ordinary skill in the art.

One advantage of such a configuration is that a zoom lens assembly 300, 500 configured in accordance with such embodiments requires no moving powered optical zoom elements 104/106/108 that require precise positioning. The remaining optical components can, therefore, be held either in a rigid mechanical assembly and never moved or only moved when the limits of stepped zoom state adjustment of the unpowered optical elements are reached. If additional magnification is required, traditional longitudinal motion of powered optical zoom elements 104/106/108 can be used to extend the zoom range of the lens, albeit while reintroducing the issues inherent in conventional zoom lenses.

In further embodiments, by combining the conventional powered optical zoom elements 110 with the unpowered optical elements 302, 304 inserted therebetween, changing of zoom states can be achieved by swapping of the unpowered optical elements 302, 304, by rotation of carriers 402, 404 or by other means, during times where speed and accuracy is critical while the conventional powered optical zoom elements 110 may be used to modify the zoom state in conjunction with changing of the unpowered optical elements 302, 304, by rotation of carriers 402, 404 or by other means, during times where speed is less critical, thereby enabling the lens to maintain a zoom state in the middle of its range, allowing fast changes of zoom state to be achieved over a relatively wider range than a system relying on changing of unpowered optical elements 302, 304 alone. In embodiments, certain interactions are programmatically controlled. In embodiments, a user may choose to bias the system, by moving the traditional powered optical zoom elements 110 to one end of their range or the other, to allow for greater range in increasing or decreasing of zoom states, dependent on their needs.

Since the positioning tolerance values associated with the placement of unpowered optical elements 302, 304, by rotation of carriers 402, 404 or by other means, is significantly less than that of powered optical elements, the zoom state of the lens depicted in FIGS. 3 and 5, as well as in embodiments in accordance therewith, can be changed without altering its pointing direction or its performance quality. The difference in tolerance sensitivity of an optical system to the motion of powered optical zoom elements 110 (as in the conventional afocal zoom lens 100 shown in FIG. 1) and to the motion of unpowered optical elements 302, 304, by rotation of carriers 402, 404 or by other means (as shown in FIGS. 3 and 5), is very significant. While the latter has practically no tolerance sensitivity whatsoever, the positions of the former must be maintained to the degree of the assembly tolerances of the original optical system to maintain the accuracy of the system.

A further benefit of the zoom control configuration described in the present disclosure is that of speed. Once the unpowered optical elements 302, 304 have completely crossed the optical footprint of the beam across the glass plate, the zoom has finished changing zoom state. This can occur as fast as the unpowered optical elements 302, 304 can travel a few millimeters of length.

One way in which this can be very quickly accomplished is by placing the unpowered optical elements 302, 304 on a wheel 402, 404, turret 402, 404, or other carrier 402, 404 that is driven in a circular, linear or other motion, as appropriate, such as by an electronic, pneumatic or other motor 502. A depiction of carriers 402, 404 and the position of unpowered optical elements 302, 304 contained therein is shown in FIG. 4. The position of those carriers in embodiments of the afocal, stepped, motorized zoom assembly 502 of the afocal, stepped, motorized zoom lens 500 is shown in FIG. 5.

In FIG. 4, two turrets 402, 404 are shown, each having four apertures 400 therethrough, although embodiments may comprise any number of apertures 400 practical or necessary. In embodiments, these turrets 402, 404 are placed between powered optical zoom elements (104, 106 and 106, 108), creating a stepped, motorized optical zoom assembly 502, as shown in FIG. 5. In such embodiments, unpowered optical elements 302, 304 of different thicknesses, which may be made of glass or other suitable material, are placed in each aperture 400 of the carriers 402, 404. Although two carriers 402, 404 are shown, embodiments may use only one carrier 402, 404 positioned between one set of powered optical zoom elements (104, 106 or 106, 108) of the stepped, motorized zoom assembly 502 or multiple carriers 402, 404 between each set of powered optical zoom elements (104, 106 or 106, 108).

In other embodiments, unpowered optical elements 302, 304 of different thicknesses would be regularly ordered in carriers 402, 404 by increasing or decreasing thickness to allow for relatively regular stepped changes in zoom state, although steps between zoom states may not be equal in all embodiments, dependent upon the application. By moving such carriers 402, 404, thereby bringing the plates 302, 304 into the optical bath between powered optical zoom elements 104, 106 and 106, 108, zoom-state changes can be rapidly achieved without altering the pointing direction of the stepped optical zoom lens 500.

Now referring to FIG. 6, a graph showing the relationship between the thickness of each of the unpowered optical elements 302, 304 of embodiments is shown. Such an assembly provides four effective zoom states. A different number of zoom states can be achieved by placing a greater or fewer unpowered optical elements 302, 304 on the carriers 402, 404.

In embodiments, a hybrid approach is used, wherein one carrier 402, 404 having a plurality of unpowered optical elements 302, 304 thereon is placed between one set of powered optical zoom elements, 104, 106 or 106, 108, while the other set of powered optical zoom elements, 104, 106 or 106, 108, is longitudinally moved thereby adjusting zoom in a conventional manner.

The embodiments of this disclosure described above are types of afocal zoom lenses. This is a lens that has no equivalent focal length and simply converts one collimated beam to another, as a variable zoom telescope or beam expander.

Figure 7:
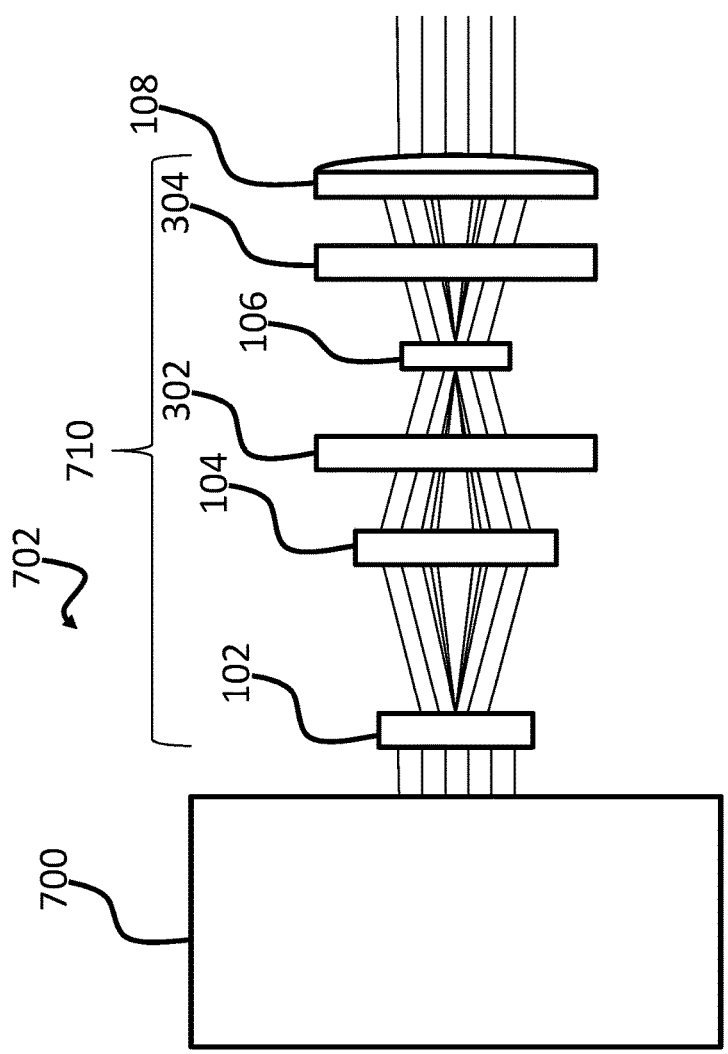
FIG. 7 is a right-side elevation view of a conventional lens mated to a stepped turret zoom that is used to create a stepped turret zoom focal lens, in accordance with embodiments of the present disclosure.

Additional embodiments of this disclosure, such as that shown in FIG. 7, place an afocal, stepped zoom assembly 710 in the optical path of a conventional focal lens 700. Together, these two devices become a lens with a variable focal length 702, and thus, a variable field of view or image scale magnification. This combined focal lens, relative to prior art devices and methods, provides speed and stability benefits.

In summary, the apparatuses and methods described herein are much more mechanically stable than conventional zoom apparatuses and methods and facilitate the creation of a zoom lens device possessing an extremely fast transition time from one zoom state to another. Embodiments of the present disclosure are immediately applicable to any environment where a zoom lens having a high degree of speed, mechanical rigidity, and optical stability is required.

The foregoing description of the embodiments of the disclosure has been presented for the purposes of illustration and description. It is not intended to be exhaustive or to limit the disclosure to the precise form disclosed. Many modifications and variations are possible in light of this disclosure. It is intended that the scope of the disclosure be limited not by this detailed description, but rather by the claims appended hereto.

What is claimed is:

1. An ultra-fast and mechanically stable zoom lens comprising:
   a first powered optical element disposed in an optical path and configured to converge a beam incident said optical path;
   a first unpowered, changeable optical element disposed in said optical path after said first powered optical element and configured to effectively alter the path length of the beam;
   a second powered optical element disposed in said optical path after said first unpowered optical element and configured to diverge a beam incident said optical path;
   a second unpowered, changeable optical element disposed in said optical path after said second powered optical element and configured to effectively alter the path length; and
   an objective lens disposed in said optical path after said second unpowered, changeable optical element and configured to collimate light incident thereon, wherein said first and second unpowered, changeable optical element are configured to provide a stepped change in zoom state by changing at least one of said first unpowered, changeable optical element and said second unpowered, changeable optical element for optical elements of different magnification.

2. The ultra-fast and mechanically stable zoom lens of claim 1 further comprising an optical element holding apparatus configured to hold a plurality of unpowered optical elements and to selectively place one of said plurality of unpowered optical elements in said optical path.

3. The ultra-fast and mechanically stable zoom lens of claim 2 wherein said optical element holding apparatus is substantially circular and comprises optical element holding apertures disposed substantially evenly about the optical element holding apparatus, wherein the optical elements are seated in the apertures.

4. The ultra-fast and mechanically stable zoom lens of claim 1 further comprising two optical element holding apparatuses, wherein each is configured to hold a plurality of unpowered optical elements and to selectively place one of said plurality of optical elements in said optical path.

5. The ultra-fast and mechanically stable zoom lens of claim 4 wherein the optical element holding apparatuses are operated by at least one of the following means: manually, semi-automatically and automatically.

6. The ultra-fast and mechanically stable zoom lens of claim 4 wherein said first powered optical element, said second powered optical element, and said objective lens are fixed in their respective positions along said optical path.

7. The ultra-fast and mechanically stable zoom lens of claim 4 wherein said first powered optical element and said objective lens are configured for longitudinal translation along said optical path.

8. The ultra-fast and mechanically stable zoom lens of claim 4 wherein said first powered optical element, said second powered optical element, and said objective lens are configured for longitudinal translation along said optical path.

9. The ultra-fast and mechanically stable zoom lens of claim 1 wherein said first powered optical element, said second powered optical element, and said objective lens are fixed in their respective positions along said optical path.

10. The ultra-fast and mechanically stable zoom lens of claim 1 wherein said first powered optical element and said objective lens are configured for longitudinal translation along said optical path.

11. The ultra-fast and mechanically stable zoom lens of claim 1 wherein said first powered optical element, said second powered optical element, and said objective lens are configured for longitudinal translation along said optical path.

12. An ultra-fast and mechanically stable variable focal length lens comprising:
a focal lens;
a first powered optical element disposed in the optical path of said focal lens and configured to converge a beam incident said optical path;
a first unpowered optical element disposed in said optical path adjacent said first powered optical element and configured to alter the path length of the beam;
a second powered optical element disposed in said optical path adjacent said first unpowered optical element and configured to diverge a beam incident said optical path;
a second unpowered optical element disposed in said optical path adjacent said second powered optical element and configured to alter the path length; and
an objective lens disposed in said optical path adjacent said second unpowered optical element and configured to collimate light incident thereon, wherein said unpowered optical elements are changeably suspended in said optical path and a stepped change in focal length may be achieved by swapping said first and second unpowered optical elements for ones of different magnification.

13. The ultra-fast and mechanically stable variable focal length lens of claim 12 further comprising two unpowered optical element holding apparatuses, wherein each is configured to hold a plurality of unpowered optical elements and to selectively dispose any of said plurality of unpowered optical elements in said optical path.

14. The ultra-fast and mechanically stable variable focal length lens of claim 13 wherein said unpowered optical element holding apparatuses comprise unpowered optical element holding apertures disposed substantially evenly about the optical element holding apparatus, wherein the optical elements are seated in the apertures.

15. The ultra-fast and mechanically stable variable focal length lens of claim 14 wherein said first powered optical element, said second powered optical element, and said objective lens are fixed in their respective positions along said optical path.

16. The ultra-fast and mechanically stable variable focal length lens of claim 14 wherein said first powered optical element and said objective lens are configured for longitudinal translation along said optical path.

17. The ultra-fast and mechanically stable variable focal length lens of claim 14 wherein said first powered optical element, said second powered optical element, and said objective lens are configured for longitudinal translation along said optical path.

18. The ultra-fast and mechanically stable variable focal length lens of claim 12 wherein said first powered optical element, said second powered optical element, and said objective lens are fixed in their respective positions along said optical path.

19. The ultra-fast and mechanically stable variable focal length lens of claim 12 wherein said first powered optical element and said objective lens are configured for longitudinal translation along said optical path.

20. An ultra-fast and mechanically stable zoom lens comprising:
a first powered optical element disposed in an optical path and configured to converge a beam incident said optical path;
a plurality of unpowered optical elements disposed in an unpowered optical element holding apparatus, wherein said unpowered optical element holding apparatus is configured to hold said plurality of unpowered optical elements and to selectively dispose at least one of said plurality of unpowered optical elements in said optical path adjacent said first powered optical element, wherein each said unpowered optical elements is configured to effectively alter the path length of the beam incident thereon by a differing amount;
a second powered optical element disposed in said optical path after said first unpowered optical element and configured to diverge the beam incident said optical path;
a plurality of unpowered optical elements disposed in a second unpowered optical element holding apparatus, wherein said second unpowered optical element holding apparatus is configured to hold a plurality of unpowered optical elements and to selectively dispose at least one of said plurality of unpowered optical elements in said optical path adjacent said second powered optical element, wherein each said unpowered optical elements is configured to alter the effective path length of the beam by a differing amount;

an objective lens disposed in said optical path after said second unpowered optical element and configured to collimate light incident thereon, wherein the selection of different combinations of unpowered optical elements disposed in said optical path accomplishes a stepped change in zoom state and wherein each said unpowered optical element holding apparatus comprises unpowered optical element holding apertures disposed substantially evenly therein, wherein the unpowered optical elements are seated in the apertures.

* * * * *